May 11, 1943.  A. Y. PREBLE  2,318,713

METHOD OF PRESERVING AND SHIPPING CORN

Filed Feb. 4, 1942

Inventor
Andrew Y. Preble

By Lyon & Lyon
Attorneys

UNITED STATES PATENT OFFICE 2,318,713

METHOD OF PRESERVING AND SHIPPING CORN

Andrew Y. Preble, El Centro, Calif.

Application February 4, 1942, Serial No. 429,516

6 Claims. (Cl. 99—154)

This invention relates to a method for preserving corn on the cob, and while the method is very useful for preserving corn on the cob in storage, it is expected to have its greatest usefulness as a method for preserving corn on the cob when shipped to distant points.

Experiments have indicated that the deterioration or loss in freshness of corn on the cob, is due largely to the loss of sugar content in the kernels. Experiments have also indicated that this loss in sugar content is greatly influenced by the temperature at which the corn is maintained.

The general object of this invention is to provide a simple method for avoiding the loss of sugar content while corn on the cob is in storage or crated during shipment.

The invention consists in the steps and combination of steps to be described hereinafter, all of which contribute to produce an efficient method of preserving corn on the cob.

A preferred embodiment of the invention is described in the following specification, while the broad scope of the invention is pointed out in the appended claims.

Figure 1:
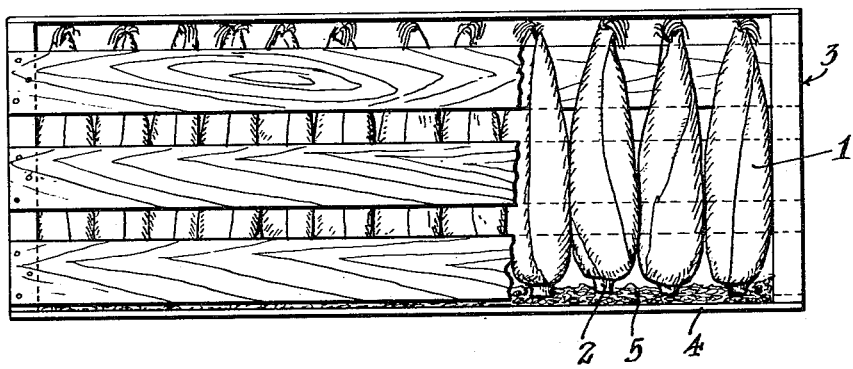
Fig. 1 is a side elevation and partial section through a shipping crate, illustrating the same packed with corn on the cob for shipment in a manner to practice my method.
Figure 2:
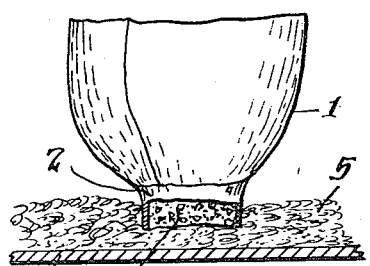
Fig. 2 is a fragmentary detailed view upon a larger scale, and illustrating the butt end of an ear of corn, together with the means which I employ in the practice of my invention.

In practicing my invention, I prefer to have the ears of corn such as the ears 1, cut off from the stalk in such a way as to leave a short stem 2, which should be of a half inch in length, or thereabout.

If the corn is to be preserved during shipment, the ears 1 are preferably packed into a crate 3 with their axes in a substantially upright position, and with the sides of the ears in contact with each other so that they will maintain themselves in this upright position. The crate 3 is preferably provided with a solid bottom 4, which is instrumental in enabling me to maintain the butt ends of the ears in contact with a pad 5 which is moistened with a watery substance, preferably a saccharine solution. The pad 5 is preferably of fibrous materials such as moss, or any other fibrous material which is of an absorbent nature.

It has been demonstrated that the deterioration of corn on the cob is due largely to loss of sugar content in the kernels, and it has also been demonstrated that this loss is greatly reduced if the temperature is maintained at a low degree; for example, it has been shown by experiment that if corn on the cob is maintained at a temperature of about 32° F., the loss of sugar content will be about 6% in the first twenty-four hours; at 40° F., the loss of sugar will amount to approximately 17% in the first twenty-four hours; at 68°, the loss will amount to about 26%; and at 86°, the loss in sugar will be approximately 50% in twenty-four hours. These figures are average figures deduced from a number of experiments.

In accordance with my method, I maintain the ears of corn in contact at their butt ends with a saccharine solution, and at the same time I maintain the temperature of the corn at approximately 40 to 45° F. Instead of employing a saccharine solution, a simple sweet syrup may be employed in a similar manner to enable the sugar in the syrup to operate as a deterrent in loss of sugar in the kernels.

While I am not certain as to the reason for the effectiveness of my method, I believe the usual loss in the sugar content is due largely to absorption of the sugar in the kernel by the cob carrying the kernels. My method maintains the cob in a more or less moist state, and supplies saccharine or sugar to the cob so as to maintain the moisture content of the cob substantially constant during the storage or shipment period, thereby preventing the cob from absorbing the sugar from the kernels of the corn.

While it has been possible heretofore to ship corn under a relatively low temperature, and in this way maintain to a certain extent the sugar content of the kernels, a considerable economy results from the practice of my method. And because I am enabled to maintain the sugar content of the corn substantially constant without employing a temperature lower than about 40 to 45° F., it is perfectly feasible to make shipments from the Corn Belt or even from points more distant from the East, in cars if a temperature of 40 to 45° is maintained during the entire trip.

It is advantageous to leave the stem 2 on the unshucked ears because it is of less area than the end of the ear. This increases the pressure of the "pad" or mat 5 against the pith 6 of the stem. The pith of course is quite absorbent and acts as an admirable conductor for the moisture moving up into the cob.

It has been found that at a relatively high temperature, for example, 86° F., the loss of sugar content in the kernels is approximately 2% per hour, while at about 68° F., the loss is approximately 1% per hour. This indicates that in practicing my process, it is advantageous to cool the corn as quickly as possible after the same has been picked.

Many other embodiments of the invention may be resorted to without departing from the spirit of the invention.

What I claim is:

1. A method of preserving corn on the cob, which consists in cutting the corn so that it presents a stem extending from the ear and maintaining a fibrous material moistened with a saccharine solution in contact with the end of the stem.

2. A method of preserving corn on the cob, which consists in cutting the ear of corn off from its stalk so as to form a stem projecting from the end of the ear, and maintaining a fibrous material moistened with a saccharine solution in contact with the cut end face of the stem.

3. A method of preserving corn on the cob in shipment, which consists in cutting the ears of corn from the stalk so as to leave a stem projecting from the end of the ear, crating and maintaining the ears in a substantially upright position with the cut ends of the stems supported on a cushion of fibrous material moistened with a sweetening agent.

4. A method for preserving corn on the cob, which consists in maintaining the butt end of the unshucked ear in contact with a moist mat of fibrous material, moistened with a sweetening agent, and maintaining the corn at a temperature of approximately 40 to 45° F.

5. A method of preserving corn on the cob, which consists in cutting the corn so that it presents a stem extending from the ear, maintaining a fibrous material moistened with a sweet solution in contact with the end of the stem, and maintaining the temperature of the corn at approximately 40 to 45° F.

6. In a method of preserving corn on the cob, the step of supplying sweetened moisture to the cut stem or butt end of the cob.

ANDREW Y. PREBLE.